March 26, 1940.                F. O. GRAHAM                2,194,593
                              BRIQUETTE MACHINE
                      Filed Aug. 17, 1937        4 Sheets-Sheet 1
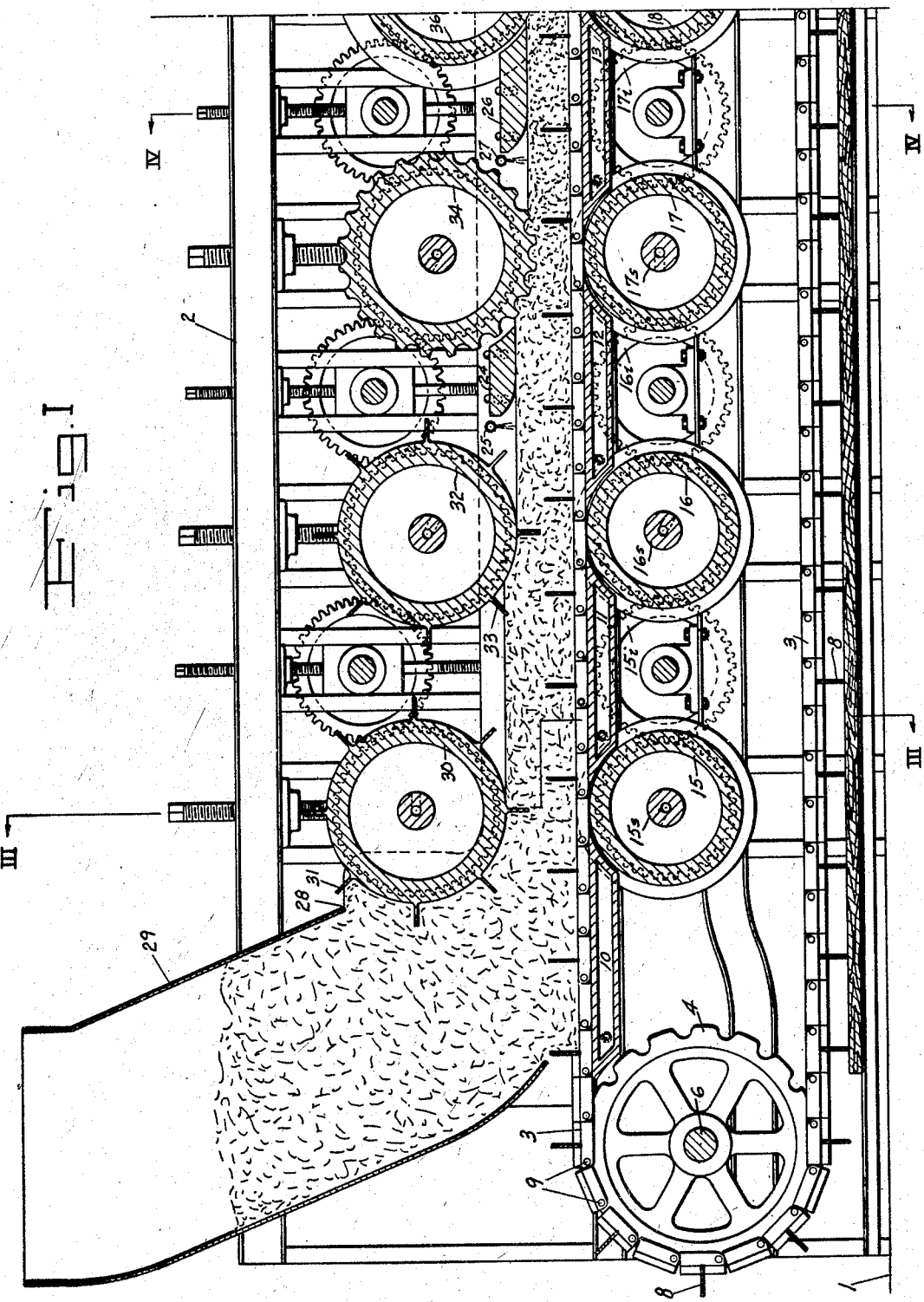
INVENTOR
FREDERICK O. GRAHAM
BY
ATTORNEY March 26, 1940.                F. O. GRAHAM                2,194,593
                              BRIQUETTE MACHINE
                    Filed Aug. 17, 1937        4 Sheets-Sheet 2
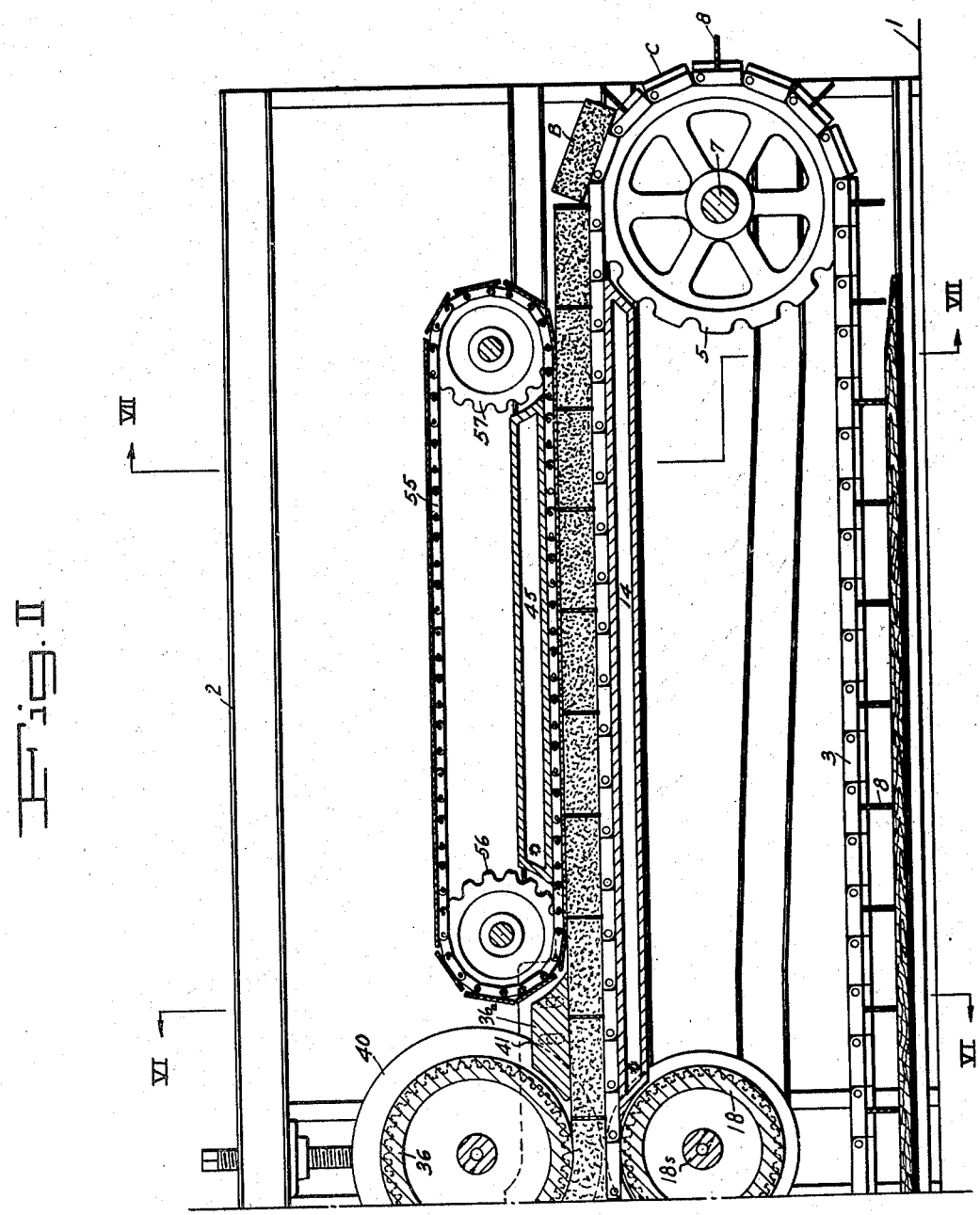
INVENTOR
FREDERICK O. GRAHAM
BY
ATTORNEY March 26, 1940. F. O. GRAHAM 2,194,593
BRIQUETTE MACHINE
Filed Aug. 17, 1937 4 Sheets-Sheet 3
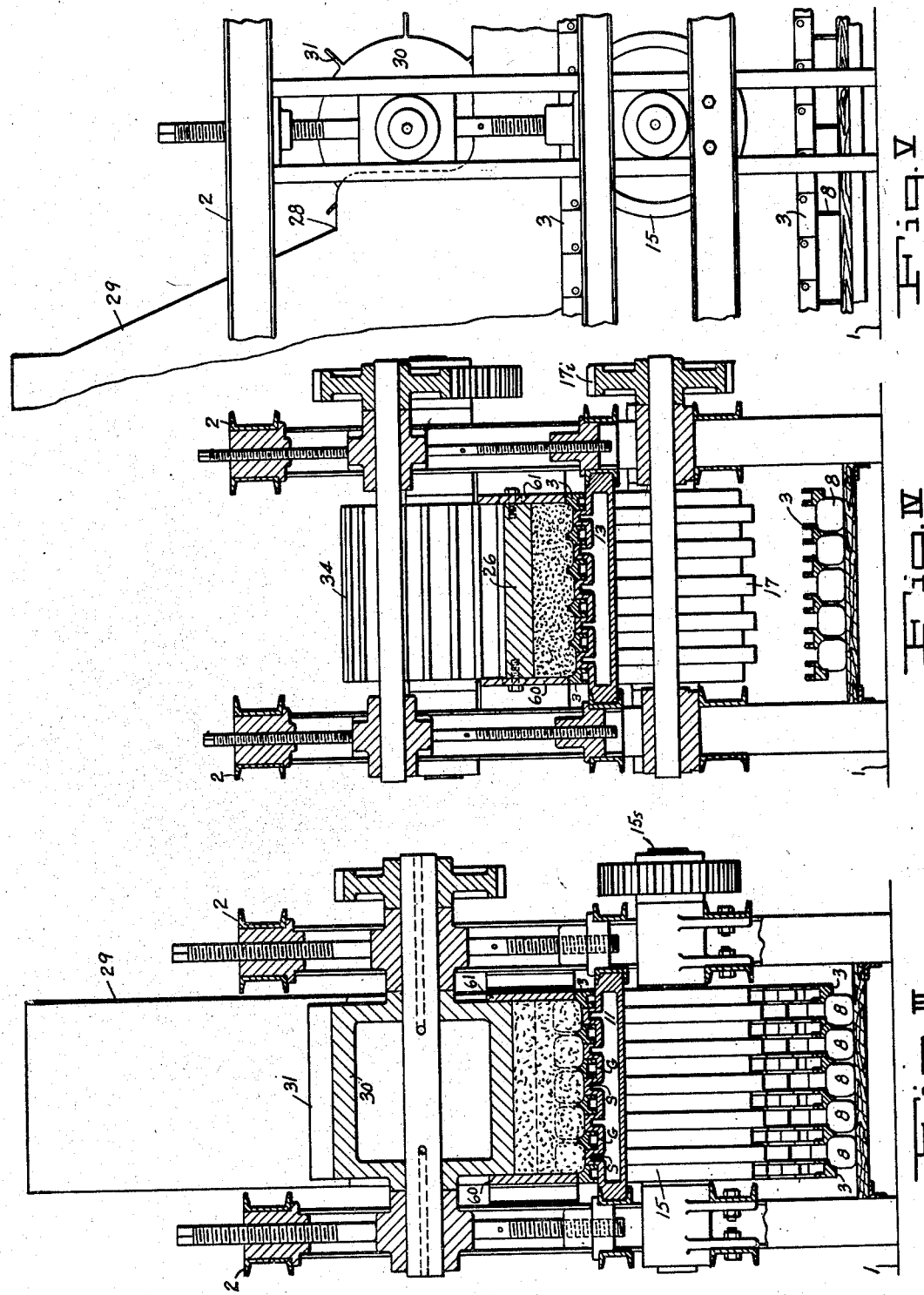
INVENTOR
FREDERICK O. GRAHAM
BY 
ATTORNEY March 26, 1940.　　　F. O. GRAHAM　　　2,194,593
BRIQUETTE MACHINE
Filed Aug. 17, 1937　　　4 Sheets-Sheet 4
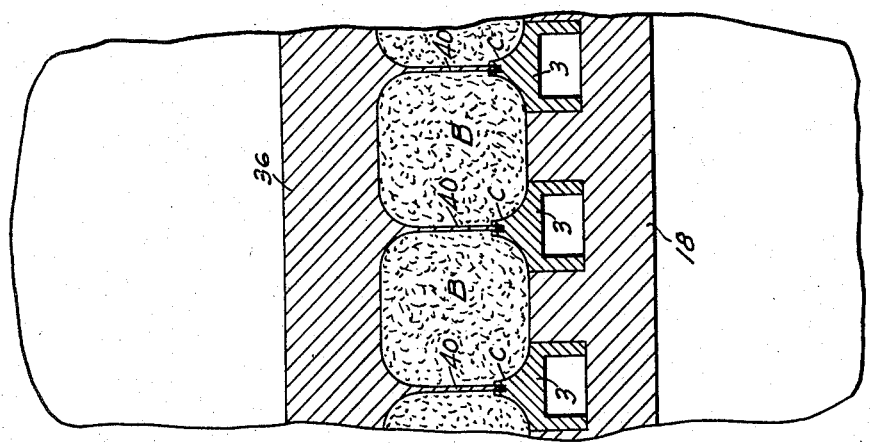
Fig. VII
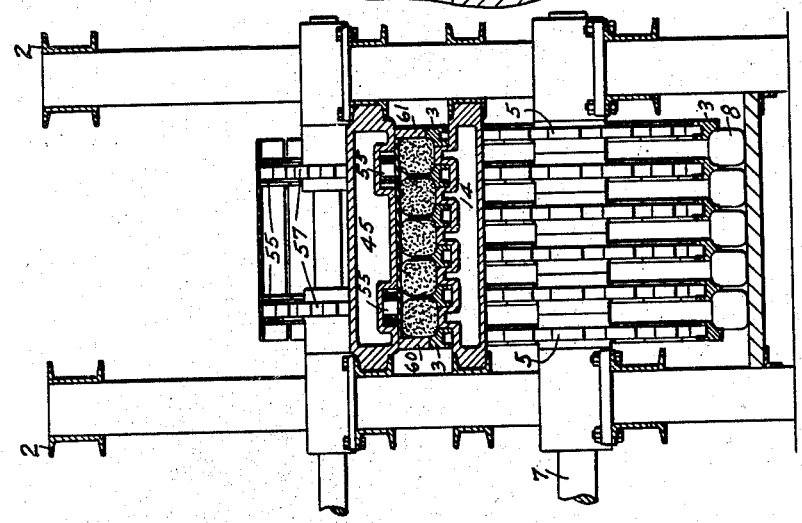
Fig. VII
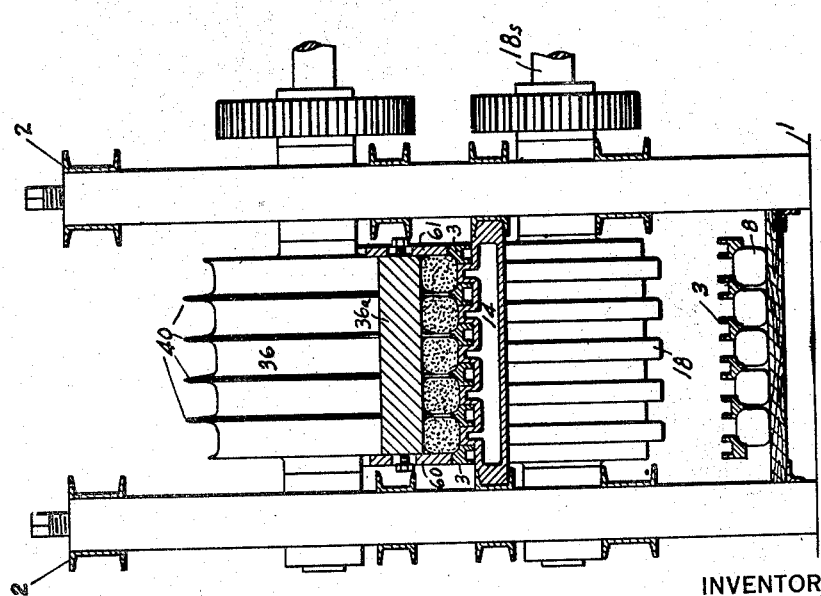
Fig. VI
INVENTOR
FREDERICK O. GRAHAM
BY
ATTORNEY Patented Mar. 26, 1940

2,194,593

UNITED STATES PATENT OFFICE 2,194,593

BRIQUETTE MACHINE

Frederick O. Graham, Longview, Wash.

Application August 17, 1937, Serial No. 159,514

8 Claims. (Cl. 44—13)

This invention relates to briquetting machines and specifically to machines for compacting and self-cementing sawdust into briquettes, for consumption in domestic heating apparatus, grates and the like.

As is well known, wood sawdust, especially sawdust from Pacific coast fir timber, contains sufficient natural resins, pitch, etc., for binding purposes as above indicated and has been heretofore used in the manner indicated, usually by forcing the saw-dust into moulds where it is subjected to heat and a high pressure, by a hydraulic ram or its equivalent. This latter method has achieved some commercial success but the cost of briquetting has prevented general use because of the high price of manufacture.

An object of the present invention is a machine that will carry on briquetting of sawdust as a continuous operation and at very much less cost than former mechanical means for making sawdust briquettes.

Since it is necessary to apply heat and high pressure to sawdust to be briquetted and it takes a relatively considerable time for heat to penetrate a mass of sawdust which is a natural insulating material, it is an object of the present invention to provide a machine for continuous briquette manufacture that provides the necessary time element in the process without interfering with the manufacturing time rate.

Another object of the invention is the provision of cooling means for the manufactured briquettes at the end of the manufacturing process but before the pressure is relieved from the product, so that surface hardening may prevent crumbling of the briquette as it leaves the machine, which causes some trouble if they are discharged hot.

These and other objects that will be apparent, constitute the purposes of the present invention, the novel features of which are pointed out in the appended claims.

I accomplish the objects enumerated and others referred to, by the mechanism and combinations of mechanical elements shown in the accompanying drawings and explained in the subjoined specification, in which:

Fig. I is a longitudinal sectional elevation of the machine, which is completed in Fig. II for lack of space on one sheet, referring to Figs. III, IV, VI and VII;

Fig. II, as stated, is a continuation of Fig. I;

Fig. III is a cross-section offset on the line III—III of Fig. I;

Fig. IV is a section on the line IV—IV of Fig. I;

Fig. V is a left-hand elevation of Fig. III with some of the left-hand parts broken away;

Fig. VI is a cross-section on the line VI—VI of Fig. II;

Fig. VII is a cross-section on the line VII—VII of Fig. II; and

Fig. VIII is an enlarged view showing the slitter roll hereinafter referred to and illustrates its cooperation with the chain mould.

In the drawings, a frame consists of a base 10 portion 1, only the top line of which is shown and upon which are various intermediate members not specifically designated because they are largely diagrammatic and can be varied widely. A beam 2 constitutes a top member. The beam 2 and intermediate frame members are largely duplicated on the respective sides of the machine, constituting with the base 1 and the top beam 2 a frame within which the various movable mechanisms and relatively stationary parts that cooperate with them are properly supported, whether for revolution in bearings, or rigidly to cooperate with the moving parts.

An essential element of the machine is the mould chain 3, which consists of several (in this case 6) chains, of identical pitch and length, mounted for movement upon two sets of sprockets such as 4 and 5 that are in turn mounted upon shafts 6 and 7. The several chains are made into a single instrumentality by plural mould blades 8, each of which is made rigid with two of the chain elements, preferably by welding, so that the six chains become one single instrumentality. The jointing of the chain or chains may be shown at 9 to give the requisite flexibility or it may be varied at will. The motion of the chain, considering the upward reach of it, between the sprockets 4 and 5, is from left to right with the reversely running reach at the bottom that is temporarily out of service as a mould.

The several lengthwise reaches, here shown to be six in number, are each provided with a rectangular groove in the top of a series of heating (or cooling) chambered tables, such as 10, 11, 12 and 13, which are connected to steam under high pressure and temperature, and 14 which is connected with a source of coolant such as cold water.

Spaced at intervals between the chambers are steam heated rolls, 15, 16, 17 and 18 which are grooved on their perimeters so that the grooves match with the grooves in the chambers, to provide a substantially continuous heated element or ridge, that reaches through the chain below the bottom of the mould blades, so that the tops of the several chain elements and the tops of the lands constitute a relatively horizontal surface, half of which moves and the other half of which remains stationary. This arrangement can be best understood from Fig. I where the chambers 10 and 11 are shown cooperating with the roll 15, and the other view of substantially the same structure in Fig. III, where the lands or ridges are shown between the grooves G.

It will be noted that for the purpose of grooving the briquettes so that they may be readily separated into regularly sized pieces, the tops of the links of the chains are formed to impress a groove in the material being processed. This is shown at C in Fig. VIII. The perimeter speed of the series of heated rolls will be synchronized with and in the same direction as the upper running reach of the mould chain 3.

The several rolls, 15, 16, 17 and 18 are mounted upon hollow shafts, 15s, 16s, 17s and 18s after any well known manner.

Each roll is provided with a spur gear or any well known means for driving it, with proper bearings for maintaining it in relatively correct position, substantially as shown or in any well known and preferred manner. To time the several rolls, idle gears 15i, 16i and 17i are provided. The source of power application may be from a shaft such as 18s, revolved by an instrumentality not shown and the chain sprockets may be driven by power means synchronized with the last named power means, that is applied to the shaft 6. All of the instrumentalities movable from the top of the mould chain downwards are relatively fixed and not adjustable in the ordinary sense of the word, while all of those that are movable, about to be described, are adjustable.

Spaced above and preferably directly over the several rolls of the lower series under the mould chain, is another series of rolls 30, 32, 34 and 36 that are also steam heated with means equivalent to those described for the lower series, which are adjustably mounted for revolution as shown and which are each provided with idler timing gears that are likewise adjustable so that when the main rolls are moved, the several gear connections are kept in proper mesh. The drawings clearly indicate diagrammatically what is required, hence it is thought that further description is unnecessary except to say that movement of this upper series of rolls will be in synchronism with that of the mould chain 3 and the instrumentalities that cooperate with it, as heretofore described.

Roll 30 is a compacting roll, being equipped with the blades 31, made rigid with its perimeter. This roll and its blades 31 take sawdust from the feed hopper 29 at its throat portion 28 and give it its first compacting, reducing its volume to less than one-third of the volume of the loose sawdust as it flows down the hopper 29, the mould chain meanwhile assisting in carrying the material forward and between the heated rolls 15 and 30, the latter being equipped with blades 31.

After its first compacting, the material is carried forward by the mould chain 3 and passes between the next pair of heated rolls, meanwhile being heated by the chain elements which become hot from contact with the heating chambers 10 and 11, where it is still further compressed between the heated rolls 16 and 32 and where initial adhesion of the particles of sawdust is thought to begin.

The material then passes relatively slowly over the heating chamber 12, becoming hotter, and under the shoe 24 which is directly above it. A spray pipe 25 applies a small amount of Diesel oil to the partly formed cake, somewhat lose on top from the action of the blades 33.

The mould chain then carries its contents between the cooperating heated rolls 17 and 34, the latter of which is preferably corrugated instead of being equipped with blades because the material becomes quite compact as it approaches this point, where it is still further heated and compressed to about its final density.

Leaving the pair of rolls 17 and 34, the top of the material is again sprayed with a small quantity of Diesel oil from the spray pipe 27, the purpose of which is to act as a cut-back for the pitchy binder in the extreme top portion of the compressed sawdust to prevent its sticking when it arrives in the cold zone. It also improves the appearance of the finished briquettes and adds slightly to their igniting ability.

The compacted material then passes under the shoe 26, over the heating chamber 13 and then between the roll 18 and the slitter roll 36 which is equipped with peripheral cutting flanges 40 (see Fig. VIII), which divides the moulded blocks defined by the spaces between the blades 8 lengthwise of the mould chain 3, so that the material is thus finally separated into several (in this case 5) briquettes B, as shown in section in Fig. VIII.

Passing from between the slitter roll 36 and the roll 18, still held in the mould chain 3 the material, now separate briquettes, passes under the shoe 36a which contains cleaning grooves 41 for the flanges 40.

The mould chain 3 then passes over the chamber 14 which contains a coolant as heretofore noted and is provided with grooves and lands similar to the heating chambers.

Immediately above the finished briquettes in the moulds of the mould chain 3 is a caterpillar type chain 55, carried by sprockets 56 and 57, suitably mounted for revolution in timed relationship to the other movable parts of the machine.

Rigidly supported inside the chain 55 and in close contact with the lower reach thereof is the coolant chamber 45, the purpose of which has been explained.

Means will be provided to receive the briquettes as they leave the end of the mould chain, to prevent their falling, as they are quite fragile until cool; such means have not been shown as they are not a part of the invention herein.

Side plates 60 and 61 are provided, that are made rigid with the frame members to complete the box-like structure through which the mould chain 3 carries the sawdust under continually increasing heat and pressure conditions, until it reaches its final density, and is then cooled sufficiently to be removed from the machine.

In designing a machine of this character, the important factor is the heat available, such as superheated steam and all of the chambers such as 10, 11, etc. will be insulated so far as expedient and suitable inlet and drain pipes will be provided for each chamber as is well known. It is thought to be impracticable, on account of the slow speed of progress, to employ a steam temperature of less than 375 degrees Fahr.

Many parts in the drawings are diagrammatic and have not been specifically designated by reference numerals such as the adjusting means for the upper series of rolls, the bearings for the rolls and means for admitting steam to the rolls, because the engineer to whom this specification is addressed needs no instruction concerning such parts, being concerned only with the general plan, its mode of operation and the result.

What I claim as new and desire to secure by Letters Patent, is:

1. A sawdust briquetting machine of the chain type, having in combination therewith, a series of spaced heated support rolls with heating tables tangent to their perimeters, the said rolls and the said tables being characterized by being provided with like chain bearing surfaces, in alignment that are alternate lands and grooves.

2. A sawdust briquetting machine comprising a mould chain of the character described, means for feeding sawdust into the chain, means for driving the chain and a series of longitudinally ribbed compacting rolls that are revoluble with their perimeters in an angular plane above the chain to apply a step by step increase of pressure to the contents of the chain under conditions of high heat, a series of parallel steam heated rollers below the chain and a series of steam heated tangentially arranged chamber members between the said lower rollers.

3. A sawdust briquetting machine having in combination therewith a mould chain of the character described, means for compressing sawdust into the chain comprising a series of pairs of steam heated rollers, the lower members of said pairs comprising in part the guide and support means for said chain with the upper members of said pairs of rollers being spaced above the chain to compress the contents thereof by increasing amounts and parallel water cooled smooth surfaced chamber members closely spaced above and below the chain that are arranged to receive the chain and its compressed contents to cool the same, after it leaves the rollers.

4. The combination as claimed in claim 3 and including oil spraying means for spraying the sawdust in the chain after it has been partially compressed, the said spraying means being arranged to oil the top of the chain contents before it contacts the top cooling chamber member.

5. In a briquetting machine comprising a mould chain of the character described, a series of rolls arranged to cooperate with said chain in the manner described and a heating chamber disposed under the chain as a support therefor, the said heating chamber being characterized by being provided with a working surface that is a series of grooves to contain separate strands of the chain and lands between the grooves that are arranged to be substantially parallel with the upper portion of said strands.

6. In a briquetting machine of the character described, a mould chain of the character described, mountings for said mould chain comprising a plurality of grooved rollers with grooved heating chambers therebetween, the grooves in said chambers being in registry with and tangent to the grooves in the rollers and each adapted to contain a strand of the said mould chain so that the said strand shall be substantially flush with the perimeters of the rolls and the upper surfaces of the chambers.

7. A sawdust briquetting machine comprising a frame, spaced heated table elements mounted in alignment in said frame, hollow heated rollers between the table elements with their top perimeters substantially level with the table elements, a box chain element that is movable over the tables and the said rollers, flanged heated compacting rollers in differently spaced relationship above the chain to increasingly compress contents of the box chain, means for feeding sawdust to the chain, oil spray means for coating the exterior of the compressed sawdust, means for dividing the compressed coated sawdust into briquettes and means of the character described for cooling the briquettes before releasing them from pressure.

8. A sawdust briquetting machine comprising a mould chain, a plurality of steam heated rollers in parallel relationship below said chain, steam heated chamber members between said rollers in tangential relationship thereto, a plurality of longitudinally ribbed steam heated rollers above said chain that are arranged to successively apply greater compacting force to the contents of the chain and parallel water containing cooling chamber members above and below the chain between which the chain is constrained to pass after traversing the zone between the rollers.

FREDERICK O. GRAHAM.